INVENTORS.
Ralph S. Zebarth
Henry E. Frederick
BY John A. Hamilton
Attorney.

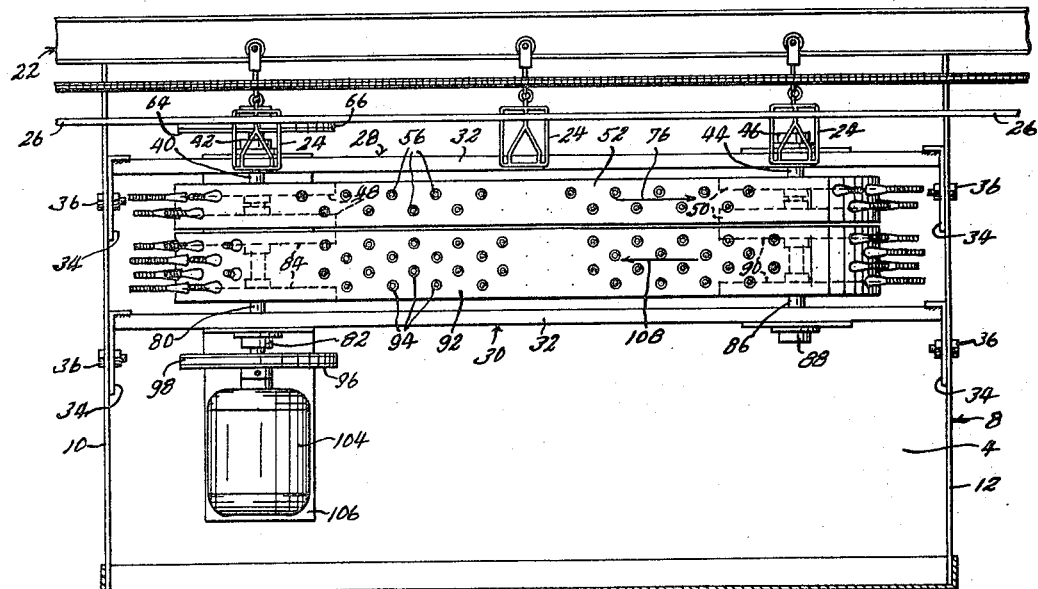
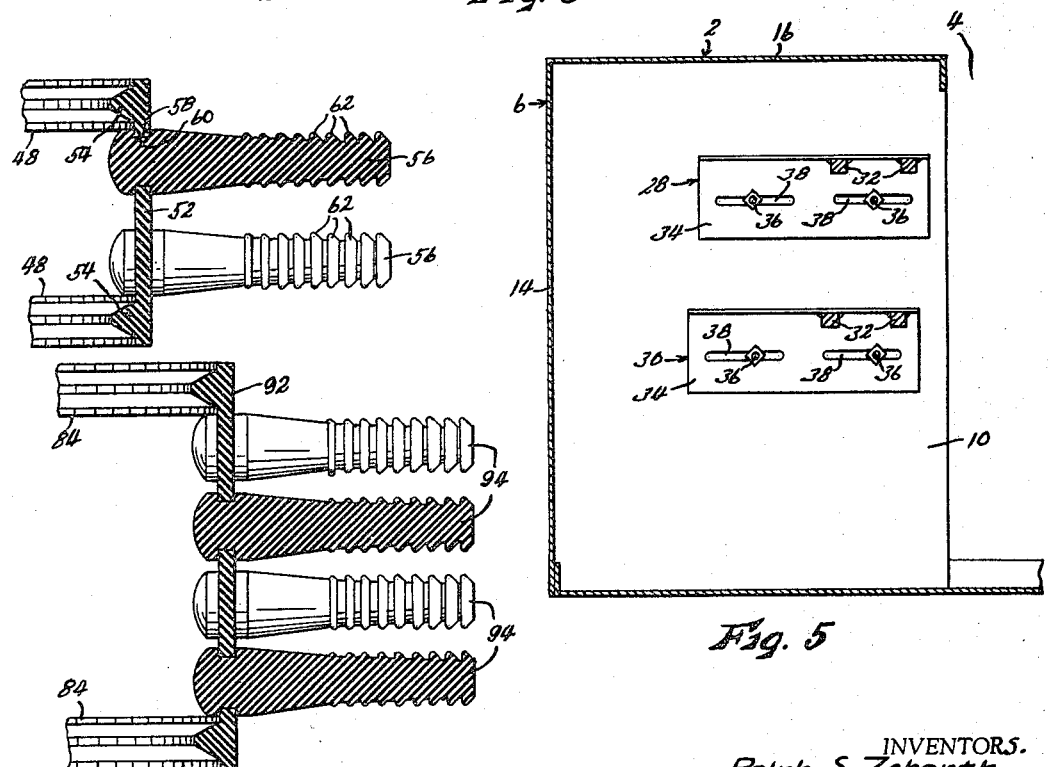

United States Patent Office 3,422,490
Patented Jan. 21, 1969

3,422,490
METHOD AND APPARATUS FOR
DEFEATHERING POULTRY
Ralph S. Zebarth and Henry E. Frederick, Kansas City, Mo., assignors to Ralph Zebarth, Inc., Kansas City, Mo., a corporation of Missouri
Filed Jan. 13, 1966, Ser. No. 520,450
U.S. Cl. 17—45                               21 Claims
Int. Cl. A22c 21/02

ABSTRACT OF THE DISCLOSURE

The method of defeathering poultry comprising suspending a bird whereby it hangs vertically and the grain of its feathers extends generally vertically, moving said bird along a predetermined path of travel, and applying a series of forces to said bird to remove feathers therefrom, said forces being applied along lines generally parallel to the path of travel of the bird and hence transverse to the grain of the feathers thereof, and apparatus for performing said method.

---

Figure 1:
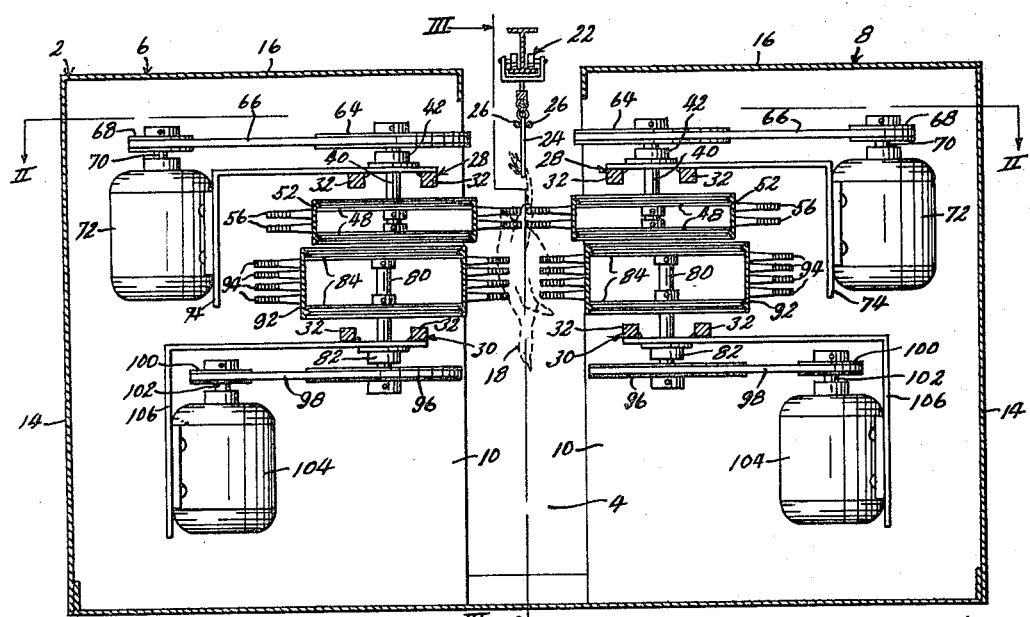

This invention relates to new and useful improvements in poultry processing procedure, and has particular reference to methods and apparatus for defeathering or plucking said poultry, and still more specifically relates to methods and apparatus of the type described including elongated flexible picking fingers so mounted and moved as to deliver blows and forces to the body of a bird transversely of the fingers, whereby to "rub" or pull feathers free of the bird, the bird having previously been scalded to loosen the feather quills or shifts in the skin. This general type of apparatus includes the great preponderance of all poultry pickers in present day usage in the poultry processing industry. The principal objects of the present invention are the provision of a method, and a corresponding apparatus, which largely eliminates many of the shortcomings and objectionable features of presently available equipment of this general type.

For example, one object of the present invention is the provision of a method and apparatus whereby the picking fingers are resiliently and yieldably supported, rather than being carried by rigid supporting structure as in present equipment. This greatly reduces the bruising, scuffing, loosening of skin and breakage of bones which often occurs with present equipment, and which of course downgrades and reduces the commercial value of the damaged birds.

Another object is the provision of a method and apparatus whereby the blows or forces delivered by the picking fingers are applied to the body of the bird in a direction transverse to the grain of the feathers. If a bird were suspended by its neck, the grain of the feathers is generally downward, and if the picking fingers were arranged to deliver downward forces, they would tend to press or "mat" the feathers against the body of the bird, and to defeat efficient feather removal. This arrangement is already almost universally avoided. Most commonly, the bird is suspended by its legs so that the grain of its feathers extends generally upwardly, and the picking fingers are moved to deliver downward forces against the feather grain. This provides generally efficient feather removal, but also often causes breakage of the feather shafts, leaving portions of said shafts in the feather follicles of the skin, particularly in larger birds such as turkeys. These remaining shafts create an objectionable darkening of color or "blackening" of the skin. The present apparatus, by delivering forces to the bird transversely to the feather grain, in large measure prevents both the matting and the feather shaft breakage. Another advantage of the "transverse picking" is that it tends to extend the wings outwardly from the body of the bird, thereby providing not only more efficient picking of the wings themselves, but also preventing said wings from shielding other portions of the body from the action of the picking fingers.

Another object is the provision of a method and apparatus whereby the structure supporting the picking fingers tends to follow and conform to the contour of the body of the bird, so that said fingers more completely "envelop" the bird and reach all portions of the body with greater efficiency, and consequently provide better picking speed and efficiency.

A further object is the provision of a method and apparatus which increases the picking efficiency by increasing the length of the finger which is effective. The speed with which the fingers engage the bird must be regulated to fall within a relatively narrow band of acceptable speeds (approximately 35–45 feet per second). Slower speeds would not effectively remove the feathers, and faster speeds would cause excessive damage to the carcass. In all present pickers of the finger type within our knowledge, with the fingers mounted on rotating drums, discs or the like, the tips of the fingers move faster than their bases, being farther from the axis of rotation. Hence, in these prior devices, the speed of rotation of the drum or the like was necessarily adjusted to give the tips of the fingers a speed within the acceptable range. As a consequence, the portions of the fingers other than the tips move too slowly to remove feathers effectively, and if the tip of a finger breaks off, a common occurrence, the entire finger might just as well be discarded. According to the present invention, however, the entire length of the finger moves at the same speed, so that the entire length thereof can move at a speed within the allowable range, and can perform effective picking.

Other objects are simplicity and economy of construction, efficiency and dependability of operation, and ready adaptability to continuous straight-through systems wherein the plucking may be only one of a series of operations performed on poultry suspended from a continuously moving conveyor.

Figure 2:
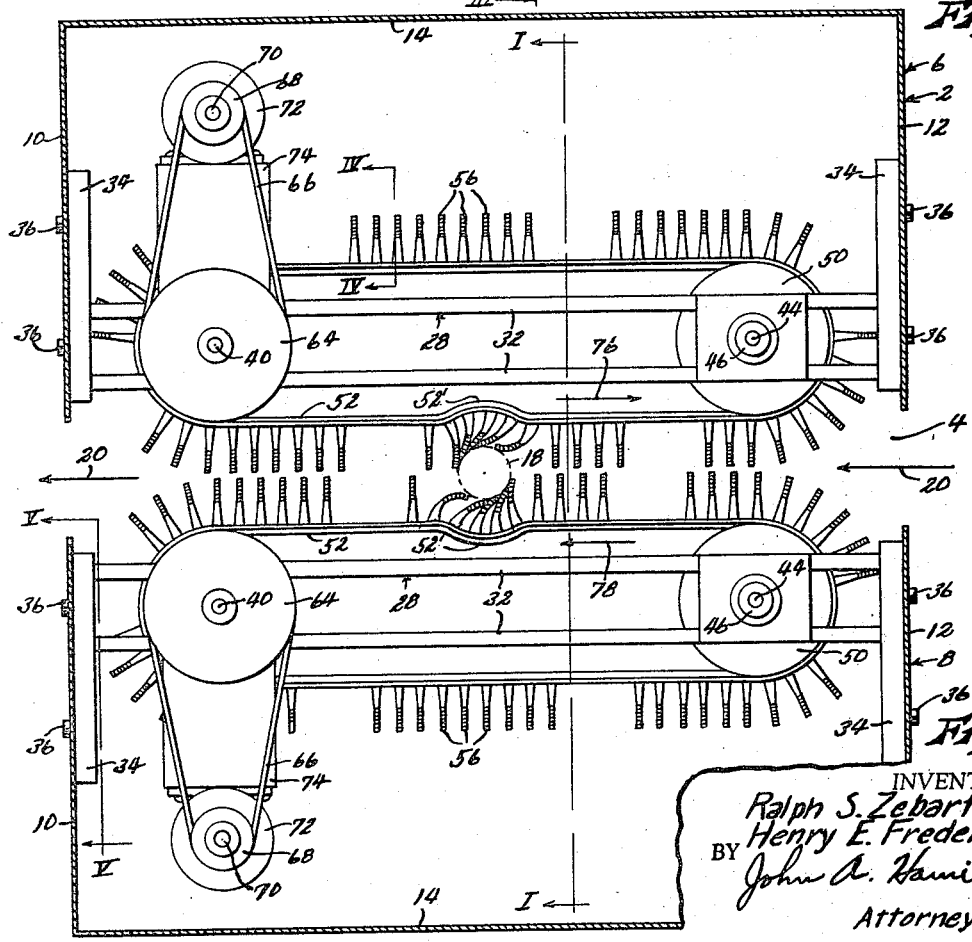

With these objects in view, as well as other objects which will appear in the course of the specification, reference will be had to the accompanying drawing, wherein:

FIG. 1 is a sectional view through an apparatus embodying the present invention, looking in a direction parallel to the direction of movement of poultry therethrough, being taken on line I—I of FIG. 2, and showing a fowl in operative relationship thereto in dotted lines, FIG. 2 is a sectional view taken on line II—II of FIG. 1, showing a bird in operative relationship to the machine, the lower set of belts being omitted, FIG. 3 is a sectional view taken on line III—III of FIG. 1, FIG. 4 is an enlarged, fragmentary sectional view taken on line IV—IV of FIG. 2, and FIG. 5 is a fragmentary sectional view taken on line V—V of FIG. 2.

Like reference numerals apply to similar parts throughout the several views, and the numeral 2 applies generally to the cabinet of the apparatus, said cabinet being formed of sheet metal, being of generally rectilinear form, and being divided longitudinally by a passageway 4 into two cabinet sections 6 and 8 opening toward each other across passageway 4, each cabinet section including end walls 10 and 12, an outer side wall 14, and a top wall 16. Carcasses of birds to be plucked, as indicated in dotted lines at 18 in FIGS. 1 and 2, are adapted to be conveyed horizontally through passageway 4 of cabinet 2, in the direction of arrows 20 in FIG. 2, by a suitable conveyor 22, each bird 18 being suspended by its legs from a suitable shackle 24 carried by said conveyor. Said conveyor and shackles may be of any of several common types well known in the art, and therefore are not detailed in the present showing. Also, each shackle is preferably passed between a pair of parallel rails 26 disposed in fixed relation to cabinet 2, whereby said shackle is prevented from swiveling about a vertical axis while in the cabinet, and each bird is maintained in a position with its legs generally in the vertical plane of movement of the bird.

Carried in each of the cabinet sections 6 and 8, which may be designated the left and right sections respectively when looking in the direction of movement of the birds through the cabinet, are in an upper frame 28 and a lower frame 30. Each of said frames consists of a pair of horizontal bars 32 extending between end walls 10 and 12 of the cabinet in a direction parallel to the direction of poultry movement, the bars 32 of each frame being welded at each end to a plate 34 lying against the inner surface of the associated cabinet end wall, and secured thereto by a pair of bolts 36 passing through horizontally elongated slots 38 formed in said plates, whereby said frames may be adjusted independently toward or from the vertical plane of poultry movement. Each of upper frames 28 carries a vertical shaft 40 adjacent end wall 10, said shaft being rotatably mounted in a bearing 42 fixed to the associated frame, and similarly carries a vertical shaft 44 disposed adjacent end wall 12 and journalled in a bearing 46 fixed to said frame. Fixed on shaft 40 are a pair of vertically spaced apart V-groove pulleys 48, and shaft 44 carries a pair of similar V-groove pulleys 50. Trained around pulleys 48 and 50 of each of the upper frames is an endless belt 52 formed of a pliable, resilient material such as fabric-reinforced rubber. Said belt is provided on its inner surface with a pair of integral V-ribs 54 (see FIG. 4) for engaging the V-grooves of pulleys 48 and 50. Said pulleys are preferably spaced so as to leave a small amount of slack in the belt.

Mounted in belt 52 are a series of resilient picking fingers 56 formed of rubber or other suitable material. Each of said fingers is elongated and of circular cross-sectional contour. Each of said fingers is provided adjacent its inner end with a peripheral groove 58 (see FIG. 4) engaged in a circular hole 60 formed therefor in the belt, whereby the finger is mounted. Said finger extends normally outwardly from the belt, and the other end portion thereof has a series of integral peripheral ribs 62 formed thereon. The shaft 40 of each frame 28 extends upwardly, and has affixed thereto a pulley 64 which is operably connected by a belt 66 to a pulley 68 fixed on the drive shaft 70 of an electric motor 72 mounted on a bracket 74 affixed to the associated frame 28, whereby belt 52 is driven by motor 72. It will be noted that the two belts 52 are both driven in counter-clockwise directions as viewed from above (see FIG. 2), so that the reaches thereof confronting each other at opposite sides of the path of poultry travel indicated by arrows 20 travel in opposite directions, as indicated by arrows 76 and 78. The free ends of fingers 56 of the two belts 52 do not meet or overlap, although they may be very closely spaced apart.

In a manner similar to upper frames 28, each lower frame 30 carries a vertical shaft 80 in a bearing 82 adjacent end wall 10, a pair of spaced apart V-groove pulleys 84 fixed on said shaft, a vertical shaft 86 in a bearing 88 adjacent end wall 12, spaced apart V-groove pulleys 90 fixed on shaft 86, a flexible belt 92 trained about pulleys 84 and 90 and carrying fingers 94, and a pulley 96 mounted on the downwardly extended end of shaft 80 and connected by belt 98 with a pulley 100 mounted on the drive shaft 102 of an electric motor 104, which is in turn mounted on a bracket 106 affixed to the associated lower frame 30. The lower belts 92 and their supporting and driving structures are omitted from FIG. 2 in the interests of clarity, but it will be understood that they are substantially identical to upper belts 52, except that the lower belts are preferably somewhat wider than the upper belts, as indicated in FIGS. 1, 3 and 4. The fingers 94 are also arranged in interrupted series as are the fingers of the upper belts. The inner reaches of the lower belts also confront each other at respectively opposite sides of the path of poultry travel indicated by arrows 20, and are spaced just below said upper belts, although they are preferably spaced somewhat farther apart than said upper belts, for reasons which will presently appear. The lower belts are both driven in a clockwise direction as viewed from above, so that their confronting reaches travel in opposite directions, Also, the upper and lower belts at each side of the path of poultry travel in respectively opposite directions, as indicated by the arrows 76 and 108 in FIG. 3. In addition, for reasons to be described, the belts, the opertaive reaches of which travel in the same direction as the poultry travel (upper left and lower right belts as shown), are driven at a linear speed which exceeds the speed of the belts the operative reaches of which travel in a direction opposite to the poultry travel (upper right and lower left belts as shown) by an amount equal to twice the speed at which the poultry is moved by conveyor 22. This may be accomplished by using variable speed motors for driving the belts, but can be accomplished more easily simply by proper selection of the ratio of the diameters of the drive pulleys 64–68 and 96–100.

In use, conveyor 22 is set in operation to move poultry carcasses 18 suspended by their legs from shackles 24 along line 20—20 between the confronting reaches of upper belts 52 and lower belts 92, usually at about 20 feet per minute by common practice, and the belts are actuated so that the fingers thereof engage the poultry carcasses at an acceptable speed great enough to remove feathers but small enough to avoid damage to the birds (about 35–45 feet per second by commonly accepted standards). Preservation of this acceptable finger speed is possible despite the fact that the forward moving fingers travel more rapidly than the rearwardly moving fingers, as stated above, since with relation to the relative speeds of fingers and carcasses during contact therebetween, the forward conveyor speed is effectively subtracted from the speed of the forwardly moving fingers, and added to the speed of the rearwardly moving fingers. The upper belts are spaced more closely than the lower belts, the fingers of the upper belts being intended to function principally on the legs and hocks of the birds, while the fingers of the lower belts are intended to function principally on the body portions of the birds. However, the spacing between the confronting reaches of the two sets of belts may be adjusted as desired by loosening bolts 36 and moving frames 28 and 30 as previously described. This adjustment also permits the belts to accommodate longer or shorter fingers, which may be desirable depending on the size of the poultry being processed.

As the bird moves through the machine as described above, it would tend to be tilted on its shackle and forced upwardly to ride on the tops of the uppermost fingers, defeating the picking action, if the confronting reaches of the sets of belts travelled in the same direction. However, the forward force of the forwardly moving fingers of one belt of each set is balanced by the rearward force of the fingers of the other belt of the set, so that the bird continues to hang in a generally vertical position so as to be subjected to the picking action of the fingers of both sets of belts. The counter-action of the two belts of each set of course tends to twist the bird about a vertical axis, and this can occur due particularly to the yieldability of the bird's legs. This twisting force is not considered objectionable, and moreover the twist imparted by one set of belts is partially counteracted by the opposite twisting effect of the other set of belts. An advantage of the twisting effect is that as the bird is periodically and momentarily relieved of the pressure of the fingers of each belt by the arrival at the bird of an unfingered or blank portion of the belt, the bird will be erratically and irregularly twisted to greater and lesser degrees, thereby exposing all portions of the carcass to the picking action of the fingers and promoting more efficient removal of feathers. Another advantage of the interruptions of the fingers of the belts, leaving portions of the belts blank, is that as the bird is relieved of finger pressure first from one side and then the other, in a random time relation, the bird is caused to swing from side to side laterally to its path of travel in an irregular and erratic pattern. This action also is conducive to thorough and intimate exposure of all portions of the carcass to the picking action of the belt fingers.

The invention possesses several other advantages of both method and apparatus. Firstly, the mounting of the fingers on pliable belts creates a yieldable or "soft" support for said fingers, promoting a more gentle picking action which not only greatly reduces damage to the bird such as bone breakage and bruising, scuffing or loosening of the skin, but also reduces breakage of the fingers and thus lengthens the effective life thereof. Such damage to the bird decreases the commercial value thereof, and the replacement of broken fingers represents a major maintenance expense with most pickers of the finger type. In all other finger pickers within our knowledge, the fingers are mounted at their bases in rotating drums, discs or other rigid structures, and hence tend to deliver harsher, more solid forces against the bird, particularly when the bird, by its irregular movement, becomes positioned so as to be engaged by portions of the fingers close to their bases. In the present structure, if the bird becomes so positioned, the yieldability of the belts permits them to be moved farther from the bird, so that the bird is still engaged only by the outer end portions of the fingers. This "soft" finger mounting is of course enhanced and increased by the slight amount of slack left in the belts as described, but the fingers nevertheless continue to function efficiently by reason of their mass and inertia. The "soft" finger mounting would have the advantages described regardless of the specific apparatus used to provide it, and is therefore considered to be an advantage of method as well as of apparatus.

Secondly, with the bird suspended by its legs so that its feathers for the most part extend generally upwardly from their points of attachment to the carcass, this direction of extension being commonly called the "grain" of the feathers, and with the belts moving horizontally, it will be seen that the picking fingers deliver forces to the carcass which are transverse to the grain of the feathers. In most present machines, the fingers deliver forces which are directly opposite or against the feather grain, and often cause breakage of feather shafts, leaving portions of said shafts in the feather follicles of the skin, particularly in larger birds such as turkeys wherein the feather shafts are relatively stiff and difficult to soften by scalding. The broken feather shafts remaining in the skin create a darkened or "blackened" appearance of said skin, which reduces eye appeal and saleability. The transverse picking performed by the present device permits the feather shafts to be pulled from the skin without the complete reverse bending of the shafts often caused by machines picking against the feather grain, and hence greatly reduce the breakage of the feather shafts. Another advantage of the transverse picking described is that the fingers tend to pull the wings of the bird horizontally outwardly from the body portion of the carcass, in the direction of belt movement. This prevents said wings from shielding other portions of the body from the picking action of the fingers, and hence promotes more thorough and efficient feather removal. In the usual machine wherein the fingers move against or opposite the grain of the feathers, the wings are often pulled downwardly against the neck, and therefore shield said neck against efficient feather removal. Moreover, due to the twisting of the bird about a vertical axis by the counter-action of opposite belts, as previously described, each wing of the bird is very seldom engaged by the fingers of more than one belt at any one time. All of the fingers of any one belt of course travel in the same direction, so that the wing is subjected only to uni-directional forces at any one time. This type of operation greatly reduces bone breakage in the wings as compared to many other types of pickers, wherein a wing may be engaged simultaneously by fingers moving in relatively opposite directions, and which thereby subject the wing to a force couple which easily breaks the fragile bones thereof. This is a valuable advantage of the present device, since wing breakage accounts for a major share of the bone breakage occurring during the usual feather removal operations. Since all of the above described advantages of transverse picking could be obtained with finger mountings other than those specifically shown, said transverse picking is considered to embody method as well as apparatus invention.

Thirdly, with the fingers carried by pliable belts as shown, particularly if said belts are slightly slack, the belts and fingers tend to "wrap around" or follow the contour of the bird, as shown at 52' in connection with belts 52 in FIG. 2. That is, not only are the belts deflected outwardly by the presence of a bird 18 (represented by a dotted circle in FIG. 2) between the confronting reaches thereof, as each portion of the belt approaches the bird, but also tend to "follow in" behind the bird as it passes the bird. The belts thus assume a wave-like contour as shown in FIG. 2, the "waves" following and enclosing the bird as it passes between the belts. The bird is therefore much more thoroughly "enveloped" by the fingers, and a greater proportion of its surface acted upon by each finger, than is possible in prior pickers wherein the fingers are mounted on drums or other rigid supports and must therefore follow a basically fixed path. This "wrap around" motion of the belts is not susceptible to easy analysis, although it is believed that each portion of the belts resists deflection before reaching the bird by reason of its inertia, and that it follows in behind the bird after passing it as a result of a harmonic rebound from its initial deflection by the bird. However, regardless of the technical explanation thereof, it is a clearly observable phenomenon, and does have the desirable effect described above.

Fourthly, a very important advantage of our invention is that since the operative confronting reaches of the belts travel in generally straight lines, the entire length of each finger moves at the same speed, and hence the entire finger, or a much greater proportion of the length thereof, can be caused to engage the bird at an efficient picking speed, thereby providing faster, more efficient feather removal. This utilization of the entire or any substantial portion of the length of each finger is not possible in prior machines wherein the finger bases are mounted in rotating rigid drums, discs or the like. In those machines the fingers are arranged generally radially to the axis of rotation of the drum or disc so that their outer free ends move faster than their base ends. Since, as previously mentioned, accepted practice requires that the speed of contact of the fingers with the bird be about 35–45 feet per second, the drum and disc machines must be designed to impart that speed to the tips of the fingers. Slower speeds will not remove feathers effectively, and faster speeds will result in excessive damage to the carcass. As a result, in the drum and disc machines only the tip portions of the fingers actually are effective, and if the tip breaks off, which is a common occurrence, the finger is essentially useless. In the present device, since the entire finger moves at the same speed, substantially its entire length, or all portions thereof except that portion of its base so close to the belt as to be undesirably rigid, may be made fully effective.

Finally, while only one apparatus unit is shown in the drawing, it will be understood that two or more such units could be disposed in series so that each bird is passed successively through said units by conveyor 22. The only difference between the units would be that corresponding belts of successive units would be caused to travel in relatively opposite directions. In this manner, any portion of the bird from which feathers had not been thoroughly removed in the first unit, due to twisting of the bird about a vertical axis as previously described or due to any limited pattern of movement of the bird which might occur in said first unit, will be thoroughly plucked by the reversed twisting and reversed movement patterns occurring in the next successive unit.

While we have shown and described a specific embodiment of the method and apparatus contemplated by our invention, it will be readily apparent that many minor changes could be made therein without departing from the spirit of the invention as defined by the scope of the appended claims.

What we claim as new and desire to protect by Letters Patent is:

1. The method of defeathering poultry comprising:
    (a) freely suspending a bird whereby it hangs vertically and the grain of its feathers extends generally vertically,
    (b) conveying said suspended bird along a predetermined generally horizontal path of travel, and
    (c) applying a series of forces to said bird while so suspended whereby to remove the feathers therefrom, the lines of action of said forces being generally parallel to the path of travel of said bird and hence transverse to the grain of the feathers thereof.

2. The method of defeathering poultry as recited in claim 1 wherein said forces are applied to said bird continuously in one direction longitudinal with respect to said path of travel.

3. The method of defeathering poultry as recited in claim 1 wherein said bird is suspended by its legs, whereby its feathers extend generally upwardly from its body.

4. The method of defeathering poultry as recited in claim 1 with the addition of the step of:
    (a) applying a second series of forces to said bird, said first and second series of forces being applied to said bird from respectively opposite sides of the path of travel thereof, the lines of action of both of said series of forces being generally parallel to said path of travel.

5. The method of defeathering poultry as recited in claim 4 wherein said first and second series of forces are applied in respectively opposite directions along said path of travel.

6. The method of defeathering poultry as recited in claim 4 wherein said first and second series of forces are applied in respectively opposite directions along said path of travel, and wherein the speed of application of the series of forces travelling in the same direction as said bird is being conveyed along its path of travel exceeds the speed of application of the opposite series of forces by an amount approximately twice the speed at which said bird is conveyed along its path of travel.

7. The method of defeathering poultry as recited in claim 4 with the additional step of:
    (a) periodically interrupting each of said series of forces in random time relation to each other, whereby said bird is caused to be irregularly oscillated laterally with respect to its path of travel.

8. The method of defeathering poultry as recited in claim 4 wherein said first and second series of forces are applied horizontally to said bird from separately opposite sides of its path of travel, and at the same vertical elevation sides of its path of travel, and at the same vertical elevation, and with the addition of the step of:
    (a) applying third and fourth series of forces to said bird from respectively opposite sides of its path of travel along lines parallel with but spaced vertically from said first and second series of forces, said third and fourth sets of forces being applied at the same vertical elevation.

9. The method of defeathering poultry as recited in claim 8 wherein said first and second series of forces are applied in respectively opposite directions, wherein said third and fourth series of forces are applied in respectively opposite directions, and wherein the two series of forces at each side of said path of travel are applied in respectively opposite directions.

10. The method of defeathering poultry as recited in claim 9 wherein the speed of application of each of said series of forces moving in the same direction as said bird is being conveyed exceeds the speed of application of the remaining series of forces by an amount approximately twice the speed at which said bird is conveyed.

11. The method of defeathering poultry as recited in claim 8 with the additional step of:
    (a) periodically interrupting each of said series of forces in random time relation to each other.

12. An apparatus for defeathering poultry comprising:
    (a) a cabinet,
    (b) means for conveying a bird, freely suspended to depend generally vertically, through said cabinet in a generally horizontal direction,
    (c) a pair of endless pliable belts,
    (d) means supporting said belts operably in a generally vertical plane in said cabinet whereby to provide confronting reaches thereof disposed generally horizontally at respectively opposite sides of and parallel to the path of travel of said bird through said cabinet,
    (e) means for driving said belts, and
    (f) a series of flexible, elongated picking fingers carried by each of said belts, each finger being fixed at one end in said belt and extending outwardly therefrom, whereby the fingers of both belts simultaneously engage a bird suspended between the confronting reaches thereof.

13. An apparatus for defeathering poultry as recited in claim 12 wherein said belt supporting means provides at least a small amount of slack in each of said belts.

14. An apparatus for defeathering poultry as recited in claim 12 wherein said belt driving means is operable to drive said belts to move the confronting reaches of said belts in respectively opposite directions with respect to the path of travel of said bird.

15. An apparatus for defeathering poultry as recited in claim 12 wherein said belt driving means is operable to drive said belts to move the confronting reaches of said belts in respectively opposite directions with respect to the path of travel of said bird, and to move the confronting belt reach travelling in the same direction as said bird is conveyed at a speed exceeding the speed of the other confronting belt reach by an amount approximately twice the speed at which said bird is conveyed.

16. An apparatus for defeathering poultry as recited in claim 12 wherein the series of picking fingers carried by each of said belts is continuous along the entire length of said belt except at periodic intervals at which said fingers are omitted.

17. An apparatus for defeathering poultry as recited in claim 12 wherein said belt supporting means includes a pair of frames each supporting one of said belts, said frames being adjustably mounted in said cabinet whereby to vary the spacing between the confronting reaches of said belts.

18. An apparatus for defeathering poultry as recited in claim 12 with the addition of:
    (a) a second pair of endless pliable belts,
    (b) means supporting said second pair of belts in said cabinet to provide confronting reaches thereof disposed generally horizontally at respectively opposite sides of and parallel to the path of travel of said bird, but spaced vertically from said first pair of belts,
    (c) means for driving said second pair of belts, and
    (d) a series of flexible, elongated picking fingers carried by each belt of said second pair and extending outwardly therefrom to engage simultaneously a bird being conveyed along said path of travel.

19. An apparatus for defeathering poultry as recited in claim 18 wherein said driving means for said second pair of belts is operable to drive said belts to move the confronting reaches thereof in respectively opposite directions with respect to the path of travel of said bird, each of said second pair of belts being driven in a direction opposite to the direction of travel of the belt of said first pair of belts which is disposed at the same side of said path of travel.

20. An apparatus for defeathering poultry as recited in claim 19 wherein the belt driving means for both of said pairs of belts are operable to drive the confronting reach of each belt which travels in the same direction as the direction of travel of said bird at a speed which exceeds the speed of travel of each confronting belt reach travelling in the opposite direction by an amount approximately twice the speed of movement of said bird along said path of travel.

21. An apparatus for defeathering poultry as recited in claim 18 wherein said means for supporting said belts includes a plurality of frames each supporting one of said belts and independently mounted in said cabinet for adjustable movement toward and from said path of travel, whereby to render the spacing between the confronting reaches of each of said pairs of belts independently adjustable.

References Cited

UNITED STATES PATENTS

| | | | |
|---|---|---|---|
| 2,311,365 | 2/1943 | Campbell | 17—11.1 |
| 2,539,688 | 1/1951 | Berg | 17—11.1 |
| 2,627,627 | 2/1953 | McDougall | 17—11.1 |
| 3,002,219 | 10/1961 | Bried | 17—11.1 |

LUCIE H. LAUDENSLAGER, *Primary Examiner.*

U.S. Cl. X.R.

17—11.1